US012583597B2

(12) United States Patent
Gariepy et al.

(10) Patent No.: US 12,583,597 B2
(45) Date of Patent: Mar. 24, 2026

(54) MONITORING OPERABILITY OF ELECTRICAL PARAMETER SENSORS FOR AIRCRAFT SYSTEM

(71) Applicant: Pratt & Whitney Canada Corp., Longueuil (CA)

(72) Inventors: Raphael Gariepy, Montreal (CA); Antwan Shenouda, Mississauga (CA); Remi Robache, Montreal (CA); James Jarvo, Long Sault (CA)

(73) Assignee: Pratt & Whitney Canada Corp., Longueuil (CA)

( * ) Notice: Subject to any disclaimer, the term of this patent is extended or adjusted under 35 U.S.C. 154(b) by 66 days.

(21) Appl. No.: 18/417,841

(22) Filed: Jan. 19, 2024

(65) Prior Publication Data

US 2025/0236402 A1 Jul. 24, 2025

(51) Int. Cl.
*B64D 27/35* (2024.01)
*B64D 31/09* (2024.01)

(52) U.S. Cl.
CPC ............. *B64D 27/35* (2024.01); *B64D 31/09* (2024.01)

(58) Field of Classification Search
CPC ................................ B64D 27/35; B64D 31/09
See application file for complete search history.

(56) References Cited

U.S. PATENT DOCUMENTS

| | | | |
|---|---|---|---|
| 6,841,291 B2 | 1/2005 | Minamiura | |
| 7,148,808 B1 | 12/2006 | Pfahlert | |
| 8,068,937 B2 | 11/2011 | Eaves | |
| 8,358,136 B2 | 1/2013 | Fredette | |
| 8,558,508 B2 | 10/2013 | Fechalos | |
| 8,558,712 B2 | 10/2013 | Fechalos | |
| 9,577,443 B2 | 2/2017 | Gach | |
| 10,120,034 B2 | 11/2018 | Hanking | |
| 10,254,351 B2 | 4/2019 | Kiuchi | |

(Continued)

FOREIGN PATENT DOCUMENTS

| | | | | |
|---|---|---|---|---|
| CN | 109274138 A | * | 1/2019 | ............. H02J 7/007 |
| CN | 115848168 A | | 3/2023 | |

(Continued)

OTHER PUBLICATIONS

EP Search Report for EP Patent Application No. 25152860.0 dated Oct. 20, 2025.

*Primary Examiner* — Donald J Wallace
*Assistant Examiner* — Jalal C Coduroglu
(74) *Attorney, Agent, or Firm* — Getz Balich LLC

(57) ABSTRACT

A method of operation is provided during which an electric motor of an aircraft is powered using a power supply. The power supply includes a plurality of power strings electrically coupled in parallel. The powering includes: outputting string electricity from each of the power strings; and outputting supply electricity from the power supply. A plurality of string parameters are measured using a sensor system. Each of the string parameters is indicative of an electrical parameter of the string electricity from a respective one of the power strings. The string parameters are added together to provide a total string parameter. A supply parameter is measured using the sensor system indicative of the electrical parameter of the supply electricity. Operability of the sensor system is evaluated based on the total string parameter and the supply parameter.

18 Claims, 2 Drawing Sheets

(56) References Cited

U.S. PATENT DOCUMENTS

| | | | | |
|---|---|---|---|---|
| 10,479,204 B2 * | 11/2019 | Murai | B60L 58/16 | |
| 2008/0205110 A1 * | 8/2008 | Boeve | G01R 33/098 | |
| | | | 324/252 | |
| 2008/0303527 A1 | 12/2008 | Fechalos | | |
| 2011/0181128 A1 * | 7/2011 | Perreault | H02M 7/797 | |
| | | | 307/151 | |
| 2014/0159666 A1 | 6/2014 | Takeyama | | |
| 2014/0247014 A1 | 9/2014 | Nishikawa | | |
| 2015/0318705 A1 * | 11/2015 | Lucas | H02J 3/48 | |
| | | | 307/129 | |
| 2017/0005378 A1 * | 1/2017 | Rong | H01M 50/227 | |
| 2017/0168131 A1 * | 6/2017 | Schneider | B60L 3/0038 | |
| 2021/0058030 A1 * | 2/2021 | Liu | H02S 50/10 | |
| 2021/0199532 A1 * | 7/2021 | Golub | G01M 3/165 | |
| 2022/0115878 A1 | 4/2022 | Khozikov | | |
| 2022/0155371 A1 * | 5/2022 | Kang | H01M 10/4207 | |
| 2022/0170388 A1 * | 6/2022 | O'Donnell | F28D 20/0056 | |
| 2022/0255335 A1 * | 8/2022 | Khozikov | H02J 7/0031 | |
| 2022/0402364 A1 | 12/2022 | Khozikov | | |
| 2023/0218962 A1 * | 7/2023 | Lee | F41B 5/1484 | |
| | | | 473/223 | |
| 2024/0175932 A1 * | 5/2024 | Fechalos | G01R 31/396 | |
| 2024/0425188 A1 * | 12/2024 | Mark | F02C 6/206 | |
| 2025/0118981 A1 * | 4/2025 | Ekström | H02J 7/0013 | |

FOREIGN PATENT DOCUMENTS

| | | | | |
|---|---|---|---|---|
| CN | 115856677 A | 3/2023 | | |
| DE | 102019200032 A1 | 7/2020 | | |
| JP | 2013176113 A * | 9/2013 | H04L 9/32 | |
| JP | 6264247 B2 | 1/2018 | | |
| KR | 20210061100 A | 5/2021 | | |

* cited by examiner

MONITORING OPERABILITY OF ELECTRICAL PARAMETER SENSORS FOR AIRCRAFT SYSTEM

TECHNICAL FIELD

This disclosure relates generally to an aircraft and, more particularly, to sensors for measuring electricity delivered to an electric component of the aircraft.

BACKGROUND INFORMATION

An aircraft may include a sensor for monitoring an electrical parameter such as electrical current of electricity output from a battery to a motor. Various types of electrical parameter sensors are known in the art, and various sensor systems with such electrical parameter sensors are known in the art. While these known sensors and sensor systems have various benefits, there is still room in the aft for improvement.

SUMMARY

According to an aspect of the present disclosure, a method of operation is provided during which an electric motor of an aircraft is powered using a power supply. The power supply includes a plurality of power strings electrically coupled in parallel. The powering includes: outputting string electricity from each of the power strings; and outputting supply electricity from the power supply. A plurality of string parameters are measured using a sensor system. Each of the string parameters is indicative of an electrical parameter of the string electricity from a respective one of the power strings. The string parameters are added together to provide a total string parameter. A supply parameter is measured using the sensor system indicative of the electrical parameter of the supply electricity. Operability of the sensor system is evaluated based on the total string parameter and the supply parameter.

According to another aspect of the present disclosure, another method of operation is provided during which an electric motor of an aircraft is powered using a power supply. The power supply includes a plurality of power strings electrically coupled in parallel. The powering includes combining string electricity from each of the power strings together to provide supply electricity output from the power supply. A plurality of string parameters are measured using a sensor system. The sensor system includes a plurality of string electricity sensors. Each of the string electricity sensors measures a respective one of the string parameters. A fault is indicated in a first of the string electricity sensors where a first of the string parameters measured by the first of the string electricity sensors is out of range of a remainder of the string parameters.

According to still another aspect of the present disclosure, another method of operation is provided during which an electric motor of an aircraft is powered using a power supply. The power supply includes a plurality of power strings electrically coupled in parallel. The powering includes combining string electricity from each of the power strings together to provide supply electricity output from the power supply. The power strings (e.g., only) include a N quantity of the power strings. A plurality of string currents are measured using a sensor system. The sensor system includes a plurality of string electricity sensors. Each of the string electricity sensors measure a respective one of the string currents. A first of the string currents is associated with a first of the power strings. One is subtracted from the N quantity to provide a N−1 quantity. A remainder of the string currents are added together to provide a remainder string current. The remainder string current is divided by the N−1 quantity to provide an average string current. A fault current for the first of the power strings is determined by subtracting the average string current from the first of the string currents.

The method may also include: adding the string parameters together to provide a total string parameter; determining a replacement string parameter for the first of the string parameters by subtracting the remainder of the string parameters from the total string parameter; and changing an input in control program for the aircraft from the first of the string parameters to the replacement string parameter following indication of the fault in the first of the string electricity sensors.

The power strings may (e.g., only) include a N quantity of the power strings. The first of the string parameters may be associated with a first of the power strings. The method may also include: subtracting one from the N quantity to provide a N−1 quantity; adding the remainder of the string parameters together to provide a remainder string parameter; dividing the remainder string parameter by the N−1 quantity to provide an average string parameter; and determining a fault current for the first of the power strings by subtracting the average string parameter from the first of the string parameters.

The method may also include disconnecting the first of the power strings from a remainder of the power strings when the fault current is equal to or greater than a threshold.

The electrical parameter may be an electrical current.

Each of the power strings may be configured as or otherwise include a battery. The power supply may be configured as or otherwise include a battery bank.

The evaluating of the operability of the sensor system may include comparing the total string parameter to the supply parameter.

The evaluating of the operability of the sensor system may also include indicating a fault in the sensor system where a difference between the total string parameter and the supply parameter is equal to or greater than a threshold.

The sensor system may include a supply electricity sensor configured to measure the supply parameter. The evaluating of the operability of the sensor system may also include indicating a fault in the supply electricity sensor where the string parameters are within a range of one another.

The method may also include changing an input in a control program for the aircraft from the supply parameter to the total string parameter when the fault is indicated in the supply electricity sensor.

The sensor system may include a plurality of string electricity sensors. Each of the string electricity sensors may be configured to measure a respective one of the string parameters. The evaluating of the operability of the sensor system may also include indicating a fault in a first of the string electricity sensors where a first of the string parameters measured by the first of the string electricity sensors is out of range of a remainder of the string parameters.

The remainder of the string parameters may be within a range of one another.

The method may also include: determining a replacement string parameter for the first of the string parameters by subtracting the remainder of the string parameters from the total string parameter; and changing an input in control program for the aircraft from the first of the string parameters to the replacement string parameter when the fault is indicated in the first of the string electricity sensors.

The power strings may (e.g., only) include of a N quantity of the power strings. A first of the string parameters may be associated with a first of the power strings. A remainder of the string parameters may be associated with a remainder of the power strings. The method may also include: subtracting one from the N quantity to provide a N–1 quantity; adding the remainder of the string parameters together to provide a remainder string parameter; dividing the remainder string parameter by the N–1 quantity to provide an average string parameter; and determining a fault current for the first of the power strings by subtracting the average string parameter from the first of the string parameters.

The method may also include disconnecting the first of the power strings from the remainder of the power strings when the fault current is equal to or greater than a threshold.

The method may also include driving propulsor rotor of a propulsion system for the aircraft using the electric motor.

The propulsion system may be configured as an electric propulsion system.

The propulsion system may be configured as a hybrid propulsion system.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
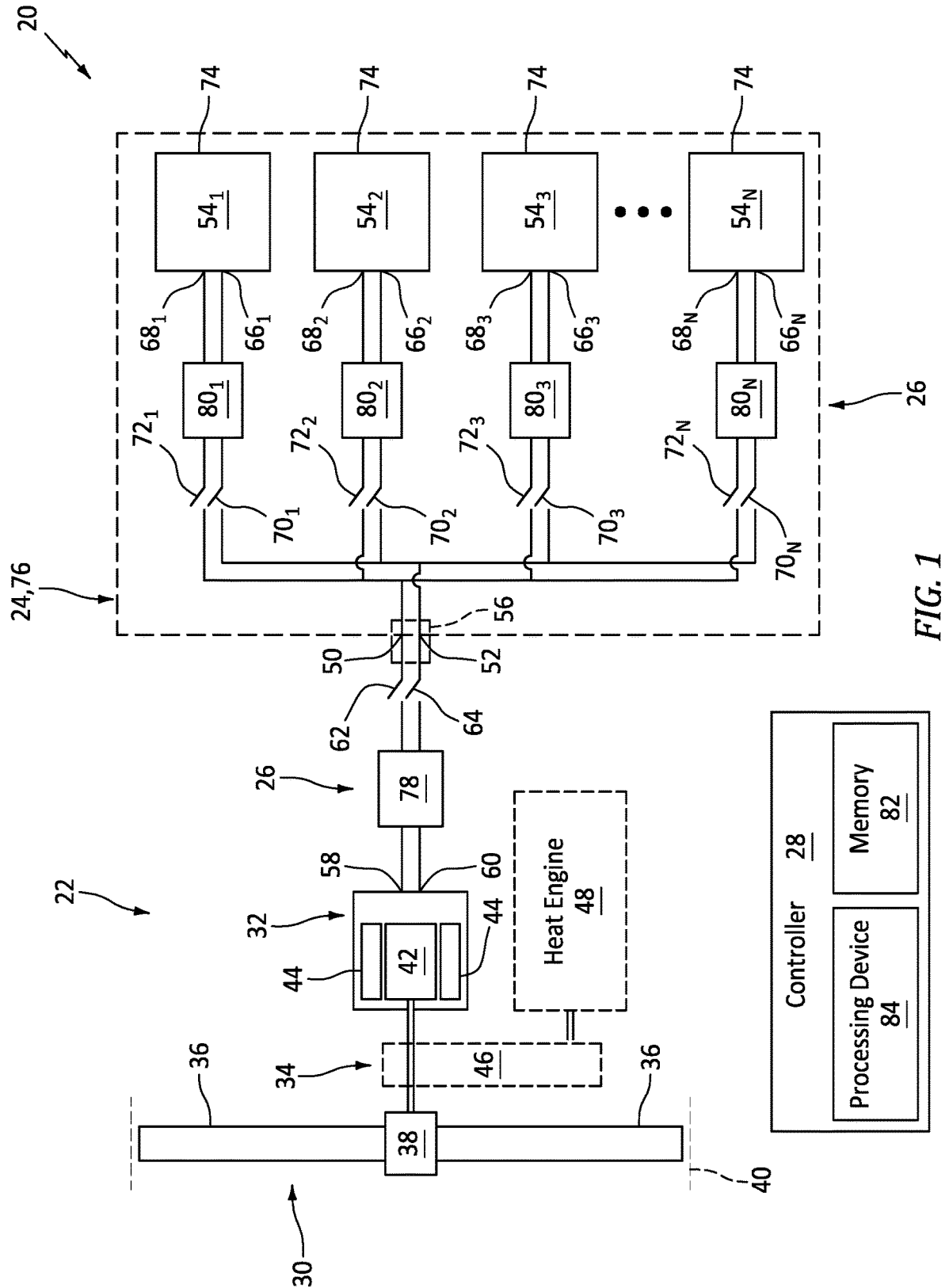
FIG. 1 is a schematic illustration of an aircraft system.

FIG. 1 illustrates a system 20 for an aircraft. The aircraft may be an airplane, a helicopter, a drone (e.g., an unmanned aerial vehicle (UAV)) or any other manned or unmanned aerial vehicle or system. The aircraft system 20 of FIG. 1 includes a propulsion system 22 for the aircraft and an electrical power supply 24 for the aircraft propulsion system 22. This aircraft system 20 also includes a sensor system 26 and a controller 28.

The aircraft propulsion system 22 includes a bladed propulsor rotor 30 (e.g., an air mover), an electric motor 32 and a drivetrain 34. The propulsor rotor 30 includes a plurality of propulsor blades 36 and a rotor base 38; e.g., a disk or a hub. The propulsor blades 36 are arranged circumferentially around the rotor base 38 in an array; e.g., a circular array. Each of the propulsor blades 36 is connected to (e.g., formed integral with or otherwise attached to) and projects radially outward from the rotor base 38. This propulsor rotor 30 may be configured as a ducted propulsor rotor. The propulsor rotor 30, for example, may be housed within and shrouded by a duct 40. An example of the ducted propulsor rotor is a fan rotor housed within a fan duct. The propulsor rotor 30 may alternatively be configured as an open propulsor rotor; e.g., an un-ducted propulsor rotor. The propulsor rotor 30, for example, may be disposed in an ambient environment external to (outside of) the aircraft propulsion system 22 and, more generally, external to the aircraft. Examples of the open propulsor rotor include a propeller rotor, a rotorcraft rotor (e.g., a main helicopter rotor), a pusher fan rotor and a propfan rotor. The present disclosure, however, is not limited to the foregoing exemplary propulsor rotor configurations.

The electric motor 32 includes an electric motor rotor 42 and an electric motor stator 44. The motor stator 44 of FIG. 1 is radially outboard of and circumscribes the motor rotor 42. With this arrangement, the electric motor 32 is configured as a radial flux electric motor. The electric motor 32 of the present disclosure, however, is not limited to such an exemplary rotor-stator configuration nor to radial flux arrangements. The motor rotor 42, for example, may alternatively be radially outboard of and circumscribe the motor stator 44. In another example, the motor rotor 42 may be axially next to the motor stator 44 configuring the electric motor 32 as an axial flux electric motor.

The drivetrain 34 operatively couples the electric motor 32 and its motor rotor 42 to the propulsor rotor 30. This drivetrain 34 may be configured as a geared drivetrain, where a geartrain 46 (e.g., a transmission, a speed change device, an epicyclic geartrain, etc.) is disposed between and operatively couples the propulsor rotor 30 to the electric motor 32 and its motor rotor 42. With this arrangement, the propulsor rotor 30 may rotate at a different (e.g., slower) rotational velocity than the motor rotor 42. However, the drivetrain 34 may alternatively be configured as a direct drive drivetrain, where the geartrain 46 is omitted. With this arrangement, the propulsor rotates at a common (the same) rotational velocity as the motor rotor 42.

During operation of the aircraft propulsion system 22, the electric motor 32 converts electricity received from the power supply 24 into mechanical power. The motor stator 44, for example, may generate an electromagnetic field with the motor rotor 42 using the electricity. This electromagnetic field may drive rotation of the motor rotor 42. The motor rotor 42 and, more generally, the electric motor 32 may thereby drive rotation of the propulsor rotor 30 through the drivetrain 34. This rotation of the propulsor rotor 30 may generate aircraft thrust and/or lift. While the electric motor 32 is described above as a dedicated electric motor, the present disclosure is not limited to such an exemplary arrangement. The electric motor 32, for example, may alternatively be configured as a motor-generator. Such a motor-generator is also configured to selectively convert mechanical power into electricity, which electricity may then be provided to the power supply 24 for storage and/or to one or more other electric components of the aircraft.

The aircraft propulsion system 22 may be configured as an electric propulsion system where the electric motor 32 (or multiple of the electric motors) is/are the only component(s) operable to drive rotation of the propulsor rotor 30. Alternatively, the aircraft propulsion system 22 may be configured as a hybrid propulsion system where the electric motor 32 (or multiple of the electric motors) and a heat engine 48 are each coupled (e.g., in parallel or in series) to and operable to drive rotation of the propulsor rotor 30. Examples of the heat engine 48 include, but are not limited to, a gas turbine engine, a rotary engine (e.g., a Wankel cycle engine), a turbo-compounded internal combustion (IC) engine, or the like. Moreover, the electric motor 32 is described herein as driving rotation of the propulsor rotor 30 for ease of description. It is contemplated, however, the electric motor 32 may also or alternatively drive rotation of (e.g., mechanically drive/power operation of) one or more other mechanical loads; e.g., a pump, a compressor (e.g., an air compressor for a pneumatic system such as an environmental control system (ECS) for the aircraft), a generator, a rotor in an aircraft engine (e.g., for engine startup), etc.

The power supply 24 of FIG. 1 includes a positive terminal 50, a negative terminal 52 and N number of electrical power strings 54₁-54_N (generally referred to as "54"), where N may be any number equal to or greater than two. The supply positive terminal 50 and the supply negative terminal 52 may form an outlet 56 for the power supply 24. This supply outlet 56 is electrically coupled to the electric motor 32 and its motor stator 44. The supply positive terminal 50, for example, is electrically coupled to a positive terminal 58 of the electric motor 32. The supply negative terminal 52 is electrically coupled to a negative terminal 60 of the electric motor 32. A positive line contactor 62 may be electrically coupled inline serially between the supply positive terminal 50 and the motor positive terminal 58. A negative line contactor 64 may be electrically coupled inline serially between the supply negative terminal 52 and the motor negative terminal 60. With this arrangement, this set of the supply contactors 62 and 64 may operate to electrically couple or decouple the power supply 24 to or from the electric motor 32.

Each of the power strings 54₁-54_N includes a positive terminal 66₁-66_N (generally referred to as "66") and a negative terminal 68₁-68_N (generally referred to as "68"). The string positive terminals 66 are electrically coupled to the supply positive terminal 50 in parallel. The string negative terminals 68 are electrically coupled to the supply negative terminal 52 in parallel. The power strings 54 are thereby electrically coupled in parallel with one another within the power supply 24. A respective positive line contactor 70₁-70_N (generally referred to as "70") may be electrically coupled inline serially between each string positive terminal 66₁-66_N and the supply positive terminal 50. A respective negative line contactor 72₁-72_N (generally referred to as "72") may be electrically coupled inline serially between each string negative terminal 68₁-68_N and the supply negative terminal 52. With this arrangement, each set of the string contactors 70 and 72 may operate to electrically couple or decouple a respective one of the power strings 54 to or from the supply terminals 50 and 52; e.g., the supply outlet 56.

Each of the power strings 54 may be configured as or otherwise include a battery 74. The power supply 24 may be configured as or otherwise include a battery bank 76; e.g., a bank of the batteries 74. The present disclosure, however, is not limited to such an exemplary power supply configuration. One or more of the power strings 54, for example, may alternatively be configured as or otherwise also or alternatively include a supercapacitor, a fuel cell and/or another electrical power storage device and/or electrical power delivery device.

The sensor system 26 of FIG. 1 includes a supply electricity sensor 78 and a plurality of string electricity sensors 80₁-80_N (generally referred to as "80"). The supply electricity sensor 78 is electrically coupled inline serially between the power supply 24 and the electric motor 32. The supply electricity sensor 78 of FIG. 1, for example, is electrically coupled between the set of supply contactors 62 and 64 and the electric motor 32. The supply electricity sensor 78, however, may alternatively be electrically coupled between the power supply 24 and the set of supply contactors 62 and 64. Each of the string electricity sensors 80 is electrically coupled inline serially between a respective one of the power strings 54 and the supply outlet 56. Each of the string electricity sensors 80₁-80_N of FIG. 1, for example, is electrically coupled between the respective power string 54₁-54_N and a respective set of the string contactors 70₁-70_N and 72₁-72_N. One or more or all of the string electricity sensors

80, however, may each alternatively be electrically coupled between the respective set of the string contactors 70 and 72 and the supply outlet 56.

Each of the electricity sensors 78, 80 is configured to measure an electrical parameter. Each electricity sensor 78, 80, for example, may be configured as a current sensor which measures an electrical current. The supply electricity sensor 78 may thereby measure the electrical current (the electrical parameter) of supply electricity output from the power supply 24 to the electric motor 32. Each of the string electricity sensors 80 may measure the electrical current (the electrical parameter) of string electricity output from a respective one of the power strings 54 to the supply outlet 56. The present disclosure, however, is not limited to such exemplary electricity sensor configurations nor to electrical current measurement. The electricity sensors 78, 80, for example, may alternatively be configured to measure another electrical parameter such as electrical voltage.

The controller 28 of FIG. 1 is in signal communication (e.g., hardwired and/or wirelessly coupled) with the electricity sensors 78, 80 as well as each set of the contactors 62 and 64, 70 and 72. The controller 28 may be configured as an onboard controller for the aircraft propulsion system 22; e.g., an electronic control unit (ECU), an electronic engine controller (EEC), a full-authority digital engine controller (FADEC), etc. The controller 28 may be implemented with a combination of hardware and software. The hardware may include memory 82 and at least one processing device 84, which processing device 84 may include one or more single-core and/or multi-core processors. The hardware may also or alternatively include analog and/or digital circuitry other than that described above.

The memory 82 is configured to store software (e.g., program instructions) for execution by the processing device 84, which software execution may control and/or facilitate performance of one or more operations such as those described in the methods below. The memory 82 may be a non-transitory computer readable medium. For example, the memory 82 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 2:
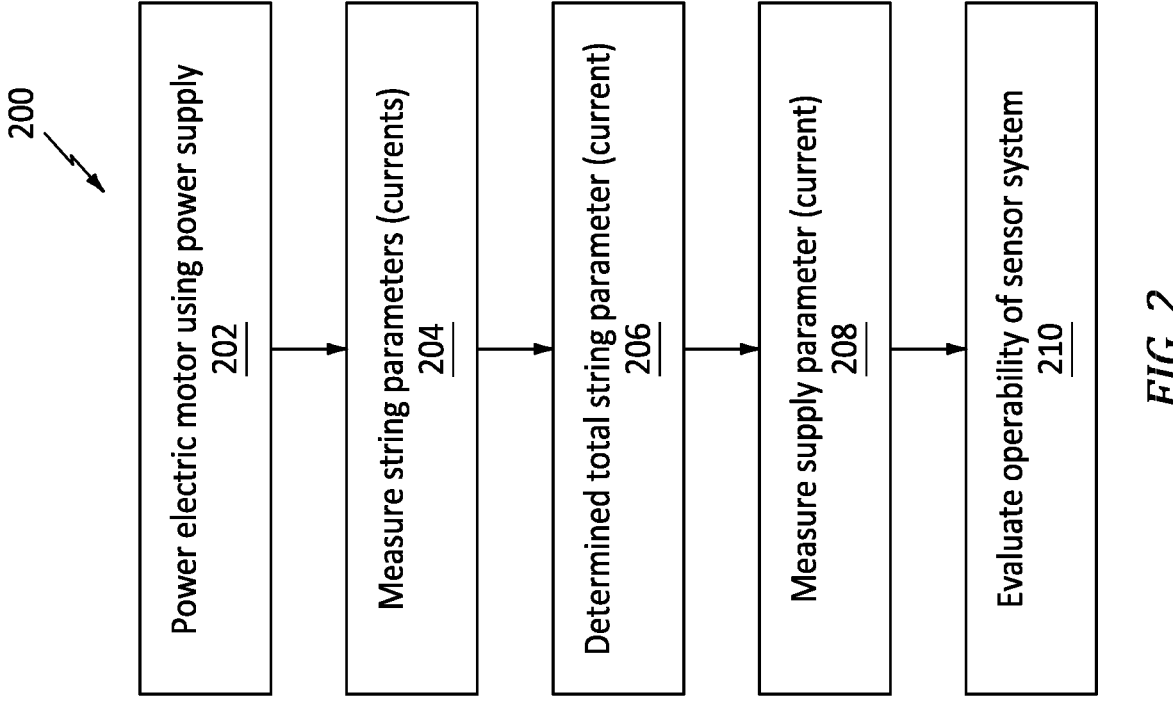
FIG. 2 is a flow diagram of a method of operation for an aircraft system.

FIG. 2 is a flow diagram of a method 200 of operation for an aircraft system. For ease of description, the operating method 200 of FIG. 2 is described below with reference to the aircraft system 20 of FIG. 1. The operating method 200 of the present disclosure, however, is not limited to such an exemplary aircraft system arrangement.

In step 202, the electric motor 32 is powered using the power supply 24. The controller 28, for example, may signal each set of the string contactors 70, 72 to close such that each of the power strings 54 may output its string electricity to the supply outlet 56. Here, each of the power strings 54 is active; e.g., outputting its string electricity to the supply outlet 56. The controller 28 may also signal the set of supply contactors 62 and 64 to close such that the power supply 24 and its supply outlet 56 may output its supply electricity to the electric motor 32. Under ideal operating conditions, the supply current output from the power supply 24 is equal to a sum of the string current output from the power strings 54. For ease of description, the operating method 200 assumes no other aircraft components besides the electric motor 32 receives the supply electricity from the power supply 24, at least upstream of the supply electricity sensor 78.

In step 204, a plurality of string parameters are measured using the sensor system 26. For ease of description, the string parameters are described below as string currents; however, the present disclosure is not limited thereto. Each of the string electricity sensors 80, for example, may measure the electrical current (the electrical parameter) of the string electricity output from each (active) power string 54. Each string current may be indicative of (e.g., equal to, derived from, correlated to, etc.) the measured electrical current associated with a respective one of the power strings 54. The string current (the string parameter) may then be communicated to the controller 28 through a respective sensor output signal from each of the string electricity sensors 80.

In step 206, a total string parameter is determined. For ease of description, the total string parameter is described below as a total string current; however, the present disclosure is not limited thereto. The controller 28, for example, may add up the string currents (string parameters) associated with the (active) power strings 54 to determine the total string current provided to the supply outlet 56.

In step 208, a supply parameter is measured using the sensor system 26. For ease of description, the supply parameter is described below as a supply current; however, the present disclosure is not limited thereto. The supply electricity sensor 78, for example, may measure the electrical current (the electrical parameter) of the supply electricity output from the power supply 24 and its supply outlet 56 to the electric motor 32. The supply parameter may be indicative of (e.g., equal to, derived from, correlated to, etc.) the measured electrical current associated with the power supply 24. The supply current (the supply parameter) may then be communicated to the controller 28 through a sensor output signal from the supply electricity sensor 78.

In step 210, operability of the sensor system 26 is evaluated. This evaluation may be based on the total string current (the total string parameter) and the supply current (the supply parameter). The controller 28, for example, may compare the total string current to the supply current. More particularly, the controller 28 may determine a difference between the total string current and the supply current; e.g., the total string current minus the supply current, or the supply current minus the total string current. Where the determined difference is less than a threshold (e.g., computed or stored in a lookup table), the controller 28 may determine the sensor system 26 is (e.g., completely) operable. The sensor signals output from the electricity sensors 78 and 80 may therefore continue to be used for controlling, monitoring and/or otherwise facilitating operation of the aircraft in general, and the aircraft propulsion system 22 more particularly. However, where the determined difference is equal to or greater than the threshold, the controller 28 may determine the sensor system 26 is operating with at least one fault. More particularly, the controller 28 may indicate (e.g., flag) a fault in the sensor system 26. This fault may then be recorded in the memory 82 (or another memory) for later retrieval, and/or communicated to an operator of the aircraft (e.g., a pilot), on ground maintenance personnel, etc.

When the fault is identified, the controller 28 may compare the individual string currents (the string parameters) to one another. Where those string currents are all within a (e.g., predetermined or variable) range of one another (e.g., all within 2% or 5% of one another), the controller 28 may determine the string electricity sensors 80 are properly functioning. In such a circumstance, the controller 28 may determine the supply electricity sensor 78 is faulty; e.g., malfunctioning. Under such circumstances, one or more inputs in a control program for operation of the aircraft (e.g., operation of the aircraft propulsion system 22) may be changed from the supply current (the supply parameter) to the total string current (the total string parameter). In other words, since the supply electricity sensor 78 is identified as being faulty while the string electricity sensors 80 are identified as being operational, the total string current (or a derivation therefrom) may be used in the control program as an estimate of the actual electrical current of the supply electricity being output to the electric motor 32. Thus, the string electricity sensors 80 may be collectively used as a redundant backup for the supply electricity sensor 78. Of course, where a fault current is suspected or otherwise identified between the supply electricity sensor 78 and the array of string electricity sensors 80, the controller 28 may alternatively signal one or more of the supply contactors 62 and 64 to open.

Where one of the string currents (e.g., associated with $80_1$) is out of range (e.g., greater than 2% or 5%) of a remainder of the string currents (e.g., associated with $80_2$-$80_N$) and the remainder of those string currents are all within a range of one another, the controller 28 may investigate the operability of the (out-of-range) string electricity sensor (e.g., $80_1$). The controller 28, for example, may replace the string current measured by the (out-of-range) string electricity sensor (e.g., $80_1$) with the string current measured by one of the remaining electricity sensors (e.g., $80_2$-$80_N$), or an average of the string currents measured by the remaining electricity sensors (e.g., $80_2$-$80_N$). The controller 28 may then add up the string currents again to determine an estimated total string current. If a difference between this estimated total string current and the supply current is below the threshold, then the controller 28 may identify a fault in the (out-of-range) string electricity sensor (e.g., $80_1$). Under such circumstances, one or more inputs in the control program for operation of the aircraft (e.g., operation of the aircraft propulsion system 22) may be changed from the string current (e.g., associated with $80_1$) to an estimated string current (or a derivation therefrom). This estimated string current may be determined by subtracting the string currents measured by the functional string electricity sensors (e.g., $80_2$-$80_N$) from the supply current. In other words, since the (out-of-range) string electricity sensor (e.g., $80_1$) is identified as being faulty while the remaining electricity sensors are identified as being operational, the supply current and the string current measured by one of the remaining electricity sensors (e.g., $80_2$-$80_N$) may be used to estimate the actual electrical current of the string electricity output from the power string (e.g., $54_1$). Thus, the functional electricity sensors (e.g., 78 and $80_2$-$80_N$) may be collectively used as a redundant backup for the faulty string electricity sensor (e.g., $80_1$). Of course, where a fault current is suspected or otherwise identified between the string electricity sensor of interest (e.g., $80_1$) and its associated power string (e.g., $54_1$), the controller 28 may alternatively signal one or more of the associated string contactors (e.g., $70_1$ and $72_1$) to open.

The comparisons of the various electrical currents associated with the supply electricity sensor 78 and the string electricity sensors 80 are described above following identification of the fault in step 210. It is contemplated, however, these comparisons may also or alternatively be performed before or concurrently with or as an alternative to the performance of the step 210.

In some embodiments, a fault current may be determined for each of the power strings 54, whether the string electricity sensor 80 associated with that power string 54 is fully operational or identified as having a fault. For example, to determine a fault current for the power string (e.g., 54₁), the controller 28 may add together the string currents associated with the remaining power strings (e.g., 54₂-54_N) to determine a remainder string current (remainder string parameter). The controller 28 may divide this remainder string current by the number N minus one (N−1) to determine an average string current (average string parameter). The controller 28 may then determine the fault current for the power string (e.g., 54₁) by subtracting the average string current from the string current measured by the string electricity sensor (e.g., 80₁) of interest. Where the determined fault current is below a threshold (e.g., computed or stored in a lookup table), the controller 28 may determine the respective power string (e.g., 54₁) is operational. However, where a difference between the average string current and the string current measured by the string electricity sensor (e.g., 80₁) is equal to or greater than the threshold, the controller 28 may determine the respective power string (e.g., 54₁) is faulty and/or circuitry coupled to the respective power string (e.g., 54₁) is faulty. The controller 28 may then signal the set of the string contactors associated with the power string (e.g., 54₁) to open and thereby electrically decouple the respective power string (e.g., 54₁) from the remaining power strings (e.g., 54₂-54_N) and the supply outlet 56.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method of operation, comprising:
powering an electric motor of an aircraft using a power supply, the power supply including a plurality of power strings electrically coupled in parallel, the powering comprising
outputting string electricity from each of the plurality of power strings; and
outputting supply electricity from the power supply;
measuring a plurality of string parameters using a sensor system, each of the plurality of string parameters indicative of an electrical parameter of the string electricity from a respective one of the plurality of power strings;
adding the plurality of string parameters together to provide a total string parameter;
measuring a supply parameter using a supply electricity sensor of the sensor system indicative of the electrical parameter of the supply electricity; and
evaluating operability of the sensor system based on a difference between the total string parameter and the supply parameter,
wherein evaluating the operability comprises indicating a fault in the supply electricity sensor in case that the difference exceeds a threshold and the plurality of string parameters are within a range of one another.

2. The method of claim 1, wherein the electrical parameter is an electrical current.

3. The method of claim 1, wherein
each of the plurality of power strings comprises a battery; and
the power supply comprises a battery bank.

4. The method of claim 1, wherein the evaluating of the operability of the sensor system comprises comparing the total string parameter to the supply parameter.

5. The method of claim 1, further comprising changing an input in a control program for the aircraft from the supply parameter to the total string parameter when the fault is indicated in the supply electricity sensor.

6. The method of claim 1, wherein
the sensor system comprises a plurality of string electricity sensors, each of the plurality of string electricity sensors is configured to measure a respective one of the plurality of string parameters; and
evaluating the operability of the sensor system further comprises indicating a fault in a first of the plurality of string electricity sensors in case that the difference exceeds the threshold and a first of the plurality of string parameters measured by the first of the plurality of string electricity sensors is out of range of a remainder of the plurality of string parameters.

7. The method of claim 6, wherein the remainder of the plurality of string parameters are within the range of one another.

8. The method of claim 6, further comprising
determining a replacement string parameter for the first of the plurality of string parameters by subtracting the remainder of the plurality of string parameters from the total string parameter; and
changing an input in control program for the aircraft from the first of the plurality of string parameters to the replacement string parameter when the fault is indicated in the first of the plurality of string electricity sensors.

9. The method of claim 1, further comprising:
the plurality of power strings consisting of a N quantity of the plurality of power strings, a first of the plurality of string parameters associated with a first of the plurality of power strings, and a remainder of the plurality of string parameters associated with a remainder of the plurality of power strings;
subtracting one from the N quantity to provide a N−1 quantity;
adding the remainder of the plurality of string parameters together to provide a remainder string parameter;
dividing the remainder string parameter by the N−1 quantity to provide an average string parameter; and
determining a fault current for the first of the plurality of power strings by subtracting the average string parameter from the first of the plurality of string parameters.

10. The method of claim 9, further comprising disconnecting the first of the plurality of power strings from the remainder of the plurality of power strings when the fault current is equal to or greater than a threshold.

11. The method of claim 1, further comprising driving propulsor rotor of a propulsion system for the aircraft using the electric motor.

12. The method of claim 11, wherein the propulsion system is configured as an electric propulsion system.

13. The method of claim 11, wherein the propulsion system is configured as a hybrid propulsion system.

14. A method of operation, comprising:

powering an electric motor of an aircraft using a power supply, the power supply including a plurality of power strings electrically coupled in parallel, and the powering comprising combining string electricity from each of the plurality of power strings together to provide supply electricity output from the power supply;

measuring a supply parameter of the supply electricity and measuring a plurality of string parameters using a sensor system, the sensor system comprising a supply electricity sensor and a plurality of string electricity sensors, and each of the plurality of string electricity sensors measuring a respective one of the plurality of string parameters;

indicating a fault in a first of the plurality of string electricity sensors where a first of the plurality of string parameters measured by the first of the plurality of string electricity sensors is out of range of a remainder of the plurality of string parameters; and indicating a fault in the supply electricity sensor in case that the plurality of string parameters are within a range of one another and a difference between the supply parameter and a sum of the plurality of string parameters exceeds a threshold.

15. The method of claim 14, further comprising:

adding the plurality of string parameters together to provide a total string parameter;

determining a replacement string parameter for the first of the plurality of string parameters by subtracting the remainder of the plurality of string parameters from the total string parameter; and changing an input in control program for the aircraft from the first of the plurality of string parameters to the replacement string parameter following indication of the fault in the first of the plurality of string electricity sensors.

16. The method of claim 14, further comprising:

the plurality of power strings consisting of a N quantity of the plurality of power strings, and the first of the plurality of string parameters associated with a first of the plurality of power strings;

subtracting one from the N quantity to provide a N−1 quantity;

adding the remainder of the plurality of string parameters together to provide a remainder string parameter;

dividing the remainder string parameter by the N−1 quantity to provide an average string parameter; and determining a fault current for the first of the plurality of power strings by subtracting the average string parameter from the first of the plurality of string parameters.

17. The method of claim 16, further comprising disconnecting the first of the plurality of power strings from a remainder of the plurality of power strings when the fault current is equal to or greater than a threshold.

18. A method of operation, comprising:

powering an electric motor of an aircraft using a power supply, the power supply including a plurality of power strings electrically coupled in parallel, the powering comprising combining string electricity from each of the plurality of power strings together to provide supply electricity output from the power supply, and the plurality of power strings consisting of a N quantity of the plurality of power strings;

measuring a plurality of string currents using a sensor system, the sensor system comprising a plurality of string electricity sensors, each of the plurality of string electricity sensors measuring a respective one of the plurality of string currents, and a first of the plurality of string currents associated with a first of the plurality of power strings;

subtracting one from the N quantity to provide a N−1 quantity;

adding a remainder of the plurality of string currents together to provide a remainder string current;

dividing the remainder string current by the N−1 quantity to provide an average string current; and determining a fault current for the first of the plurality of power strings by subtracting the average string current from the first of the plurality of string currents.

* * * * *